United States Patent [19]

Sato

[11] 4,417,284
[45] Nov. 22, 1983

[54] GAIN CONTROL CIRCUIT FOR A VIDEO TAPE RECORDER WHEREIN THE CHROMINANCE IS GAIN CONTROLLED IN RESPONSE TO THE LUMINANCE SIGNAL AS WELL AS THE CHROMINANCE SIGNAL

[75] Inventor: Ichitaro Sato, Zama, Japan

[73] Assignee: Sony Corporation, Tokyo, Japan

[21] Appl. No.: 257,625

[22] Filed: Apr. 27, 1981

[30] Foreign Application Priority Data

Apr. 29, 1980 [JP] Japan ................................. 55-56878

[51] Int. Cl.³ .......................................... H04N 9/491
[52] U.S. Cl. .................................................. 358/316
[58] Field of Search ...................... 358/4, 8, 21 R, 27, 358/39, 315

[56] References Cited

U.S. PATENT DOCUMENTS

| | | | |
|---|---|---|---|
| 3,107,275 | 10/1963 | Chatten | 358/27 X |
| 3,109,887 | 11/1963 | Bradley | 358/27 |
| 4,007,485 | 2/1977 | Sato | 358/8 |
| 4,068,257 | 1/1978 | Hirota et al. | 358/4 |
| 4,219,839 | 8/1980 | Watanabe | 358/27 |

*Primary Examiner*—Aristotelis M. Psitos
*Attorney, Agent, or Firm*—Hill, Van Santen, Steadman & Simpson

[57] ABSTRACT

A detected luminance signal level is superimposed on a control signal of an automatic color control loop mounted in a chrominance signal path of an undercolor video tape recorder for compensating differential gain of the reproduced chrominance signal.

9 Claims, 5 Drawing Figures

GAIN CONTROL CIRCUIT FOR A VIDEO TAPE RECORDER WHEREIN THE CHROMINANCE IS GAIN CONTROLLED IN RESPONSE TO THE LUMINANCE SIGNAL AS WELL AS THE CHROMINANCE SIGNAL

BACKGROUND OF THE INVENTION

1. Field of the Invention

This invention relates to a reproducing circuit for a video tape recorder and more particularly to a differential gain control circuit installed in the reproducing circuit.

2. Description of the Prior Art

Conventional circuits for prior art VTR video tape recorders are known. In the recording circuit of prior art VTR devices a color video signal of, for example, a NTSC system is fed to a low pass filter and to a band pass filter for separating the luminance and chrominance signals (the color subcarrier frequency being 3.58 MHz). The separated luminance signal is fed through a pre-emphasis circuit to an FM modulating circuit and the chrominance signal is fed to a frequency converting circuit for converting it to a frequency from 3.58 MHz to 688 KHz, for example. The FM modulated luminance signal and the frequency converted chrominance signal are then supplied to an adding circuit and the thus combined FM luminance signal and the chrominance signal are supplied through a recording amplifier to a pair of rotary magnetic heads. These heads are mounted on a rotary disc or drum spaced apart from each other by an angular distance of 180°. These heads form skewed record tracks on a magnetic tape as one record track for each field.

FIG. 1 illustrates a prior art reproducing circuit for the prior art video tape recorder. In FIG. 1, a pair of rotary magnetic heads Ha and Hb mounted on a disc DS 180° from each other are rotated by a motor Mr which has its output shaft AX connected to the disc DS. A pair of magnets MG are mounted on the axis AX 180° relative to each other and a magnetic pick-up $H_p$ is mounted so as to detect the magnetic field produced by the magnets MG and generates a 30 Hz signal in case of the NTSC color signal. The outputs of the pair of rotary magnetic heads Ha and Hb are respectively supplied to amplifiers 1a and 1b which have their outputs connected to terminals of a change-over switch SW1 and which changes over at every field. The pulse signal from the rotary position detecting device PG is supplied to a switching control signal generating circuit 13 which produces a switching pulse to the change-over switch SW1 so as to change the switch-over at every field.

The output of the change-over switch SW1 is supplied to a high pass filter 2 for deriving the FM luminance signal and to a low pass filter 3 for deriving the frequency converter chrominance signal. The output of filter 2 is applied to an FM demodulating circuit 4 which demodulates it and the demodulated luminance signal is supplied to a de-emphasis circuit 5 which furnishes its output to an adding circuit 6.

The frequency converted chrominance signal is supplied from the filter 3 to a gain control 8 which supplies its output to a frequency reconverting circuit 9 which supplies its output to the adder 6. The chrominance signal, (the color subcarrier frequency of which is 3.58 MHz) from the converter 9 is applied to the adding circuit 6 where the chrominance and luminance signals are combined after being added and applied to the output terminal 7.

The chrominance signal from the frequency reconverting circuit 9 is also fed to a burst gate circuit 10 where the color burst signal of 3.58 MHz is extracted. The burst signal thus extracted is supplied to an automatic phase control circuit 11 which receives a reference signal from a reference oscillator circuit 12 and supplies an input to the converter 9. An output carrier 4.27 MHz generated in the automatic phase control circuit 11 is supplied to the frequency reconverting circuit 9.

An automatic color control circuit 20 provides an input to the variable gain control circuit 8 which is in the signal transmission path for the chrominance signal. The automatic color control generating circuit 21 includes the burst gate generator 10 which supplies an output to an AM detecting circuit 14 which detects the envelope of the applied signal supplied with the burst signal from the burst gate circuit 10. The AM detecting circuit 14 includes a switchable time constant circuit formed of capacitors 15a and 15b which have first sides connected to ground and other sides connected to contacts of switch SW2 which is connected to the output of the detector 14. The switch SW2 is controlled by the field burst from the switching control signal generator 13 so as to change the level of the chrominance signal as a function of the position of the rotary magnetic heads Ha and Hb. The output of the detector 14 is connected to the gain control terminal of the gain control circuit 8.

A differential gain DG is induced in the electromagnetic converting system because the low frequency converted chrominance signal is mixed with the FM modulated luminance signal and is thereafter recorded and/or reproduced. In the example illustrated in FIG. 1, the FM modulated luminance signal becomes an AC bias signal for the frequency converted chrominance signal during recording so that the differential gain DG depends upon the variation of the luminance signal. Thus, the differential gain DG cannot be corrected by a conventional ACC circuit. This differential gain will be greater deteriorated each time that dubbing procedures are repeated.

SUMMARY OF THE INVENTION

It is an object of the present invention to provide a novel video signal reproducing circuit.

Another object of the invention is to provide a video signal reproducing circuit which has a differential gain compensator.

Another object of the invention is to provide a color composite video signal reproducing circuit suitable for use in a VTR in which an undercolor recording system is utilized.

In the color video signal reproducing circuit according to the invention, the chrominance signal level is controlled in response to the level of the luminance signal superimposed on an ACC control signal loop. The level detecting circuit provided from the demodulated luminance signal is supplied to the side of a capacitor which is mounted into the ACC loop and then passes to the gain control amplifier of the ACC loop through the capacitor.

According to an aspect of the invention, there is provided a signal reproducing circuit for an under-chroma recording and/or reproducing system which comprises:

(A) transducer head means for producing a composite color video signal from the recording medium;

(B) signal separating means connected to the transducer head means for separating an FM luminance signal and a chrominance signal from the reproduced composite color video signal;

(C) demodulating means provided in a signal path of the separated FM luminance signal for demodulation;

(D) gain control means provided in the signal path of the separated chrominance signal for controlling the signal level of the chrominance signal based on a reference signal included in the chrominance;

(E) level detecting means for detecting the level of the demodulated luminance signal obtained from the demodulating means; and (F) differential gain control means for controlling the signal level of the chrominance signal in response to a detected level of the chrominance signal by applying the detected signal to said gain control means.

Other objects, features and advantages of the present invention will become apparent from the following description of the invention taken in conjunction with the accompanying drawings in which like references designate the same elements and parts.

DESCRIPTION OF THE PREFERRED EMBODIMENTS

Figure 1:
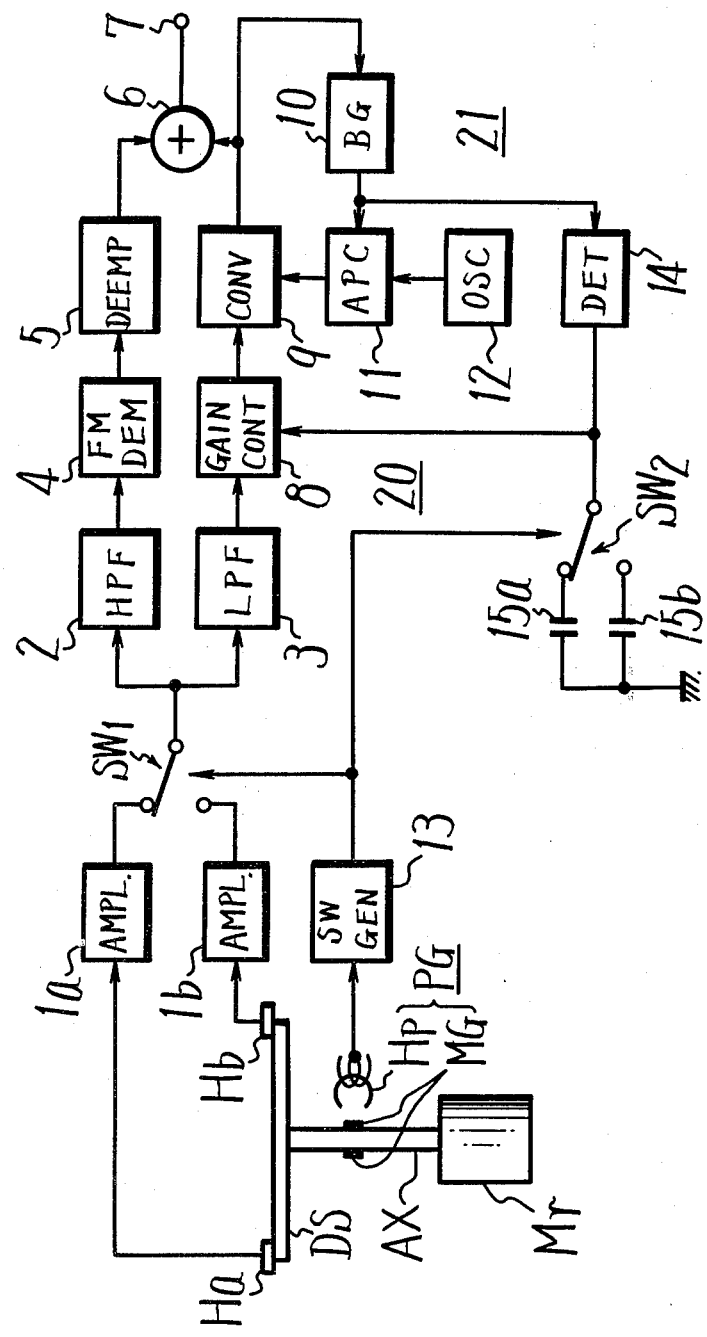
FIG. 1 is a schematic block diagram illustrating a reproducing system of a prior art VTR.
Figure 2:
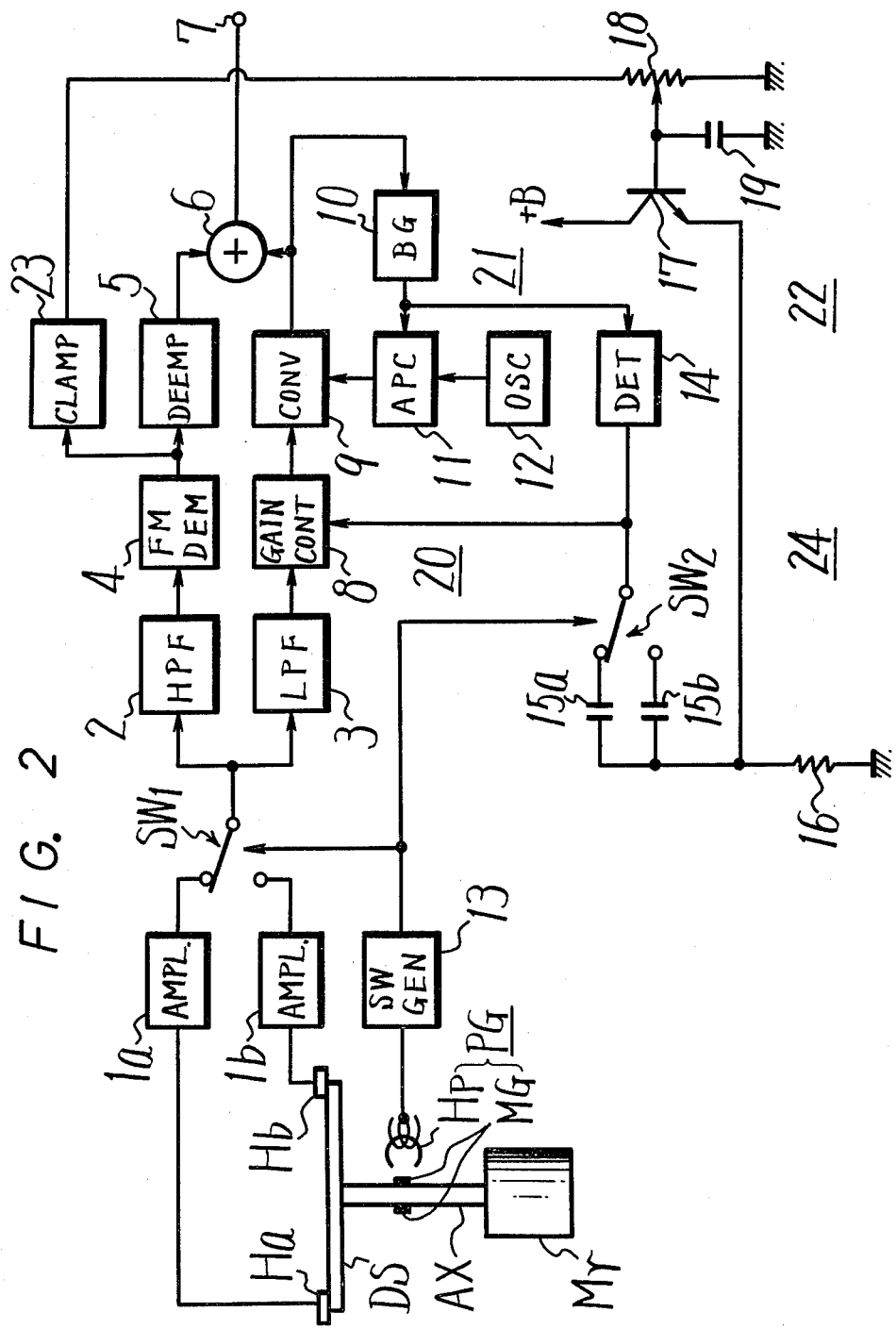
FIG. 2 is a schematic block diagram illustrating the reproducing system of a VTR which is an example of the present invention.

FIG. 2 illustrates the reproducing circuit of a VTR with an example of the present invention applied. Those elements illustrated in FIG. 1 of the prior art which are identical to those illustrated in FIG. 2 are designated by the same numerals and those elements will not be described relative to FIG. 2. It is to be noted that a resistor 16 is connected between ground and the common ends of the capacitors 15a and 15b for example. The recording circuit for the VTR of the invention is the same as that described above and the description thereof is omitted.

A differential gain correcting circuit 24 is included in FIG. 2 so as to control the variable gain control 8 between the low pass filter 3 and the frequency reconverting circuit 9. Also, the control signal generating circuit 21 for generating the ACC control signal which is to be fed for the variable gain amplifier 8 is provided in the circuit of FIG. 2 which is substantially the same as that of FIG. 1.

A level detecting circuit 22 for detecting the level of the demodulated luminance signal is provided in the circuit of FIG. 2 and a pedestal clamp circuit 23 receives the output of FM demodulator circuit 4 and removes the fluctuating component of an APL (average picture level) and then supplies an output to one end of a potentiometer 18 which has its other end grounded for adjusting the detected signal level. A movable contact of the potentiometer 18 is connected to the base of a NPN transistor 17 and a by-pass capacitor 19 is connected between the base and ground so as to by-pass high frequency components. The collector of transistor 17 is connected to a suitable power supply terminal B+ and the emitter is grounded through the resistor 16 which is also connected to first sides of the capacitors 15a and 15b. Thus, the detected output of the level detecting circuit 22 is applied to the variable gain control circuit 8 and is superimposed on the ACC control signal as the gain control signal.

The operation of the differential gain correcting circuit 24 operates as follows. The color burst signal from the burst gate circuit 10 is envelope-detected by the AM detecting circuit 14 and then supplied to charge the capacitors 15a or 15b. In this case, since the transistor 17 is illustrated as an emitter follower, the resistor 16 can be omitted and the commonly connected sides of the capacitors 15a and 15b can be considered as being grounded with respect to the ACC control.

Figure 3A:
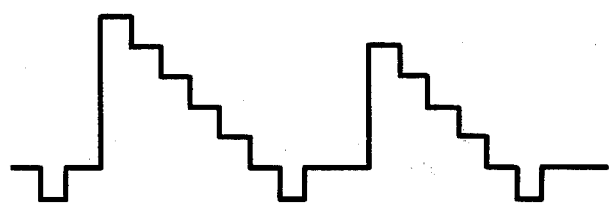
FIGS. 3A, 3B and 3C illustrate wave form diagrams used to explain the operation of the invention illustrated in FIG. 2.

The luminance signal from the FM demodulating circuit 4 and FIG. 3A illustrates an example of the luminance signal is adjusted by potentiometer 18 to a suitable level and then the high frequency components are removed by the by-pass capacitor 19. Then the signal is applied through the resistor 16 through the base emitter of the transistor 17. The signal voltage applied to the resistor 16 is applied to the variable gain control circuit 8 through the capacitors 15a and 15b.

Figure 3B:
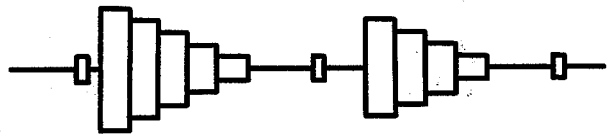

The frequency converted chrominance signal from the low pass filter 3 is changed as shown in FIG. 3B in level in response to the level of the luminance signal illustrated in FIG. 3A. In other words, when the level of the luminance signal is the white level, the level of the frequency converted chrominance signal will reach its maximum level.

Figure 3C:
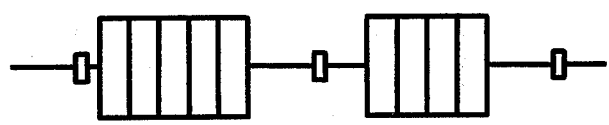

Thus, as the level of the luminance signal illustrated in FIG. 3A becomes high, the gain of the variable gain control circuit 8 becomes lower. Therefore, the level of the frequency converted chrominance signal at the output side of the variable gain control circuit 8 will become constant as illustrated in FIG. 3C. In this case, since the pedestal level of the luminance signal illustrated in FIG. 3A is constant, the gain at the burst signal portion will be constant.

The variable control circuit can be provided anywhere in the chrominance signal path. It may be also possible that the ACC control signal generating circuit 21 generates the ACC control signal based upon a color burst signal extracted either in the high frequency or low frequency side of the chrominance signal path. Also, the ACC control loop may be a closed loop or an open loop. In the example of the invention illustrated in FIG. 2, the ACC control loop is a closed loop.

According to the present invention, the differential gain can be controlled by a simple circuit.

When the clamp circuit 23 is provided in the level detecting circuit 22, the influence of fluctuations of the APL will be avoided so that the differential gain can be corrected with high accuracy.

When the present invention is applied to the reproducing system of a VTR, even if dubbing operations are carried out the deterioration of the picture quality can be suppressed and will be very small.

The invention has been described with a single preferred embodiment, but it will be apparent that many modifications and variations could be effected by one skilled in the art without departing from the spirit and scope of the novel concepts of the invention which are to be determined only by the appended claims.

I claim as my invention:

1. A signal reproducing circuit for an under-chroma recording and/or reproducing system, comprising: transducer head means for reproducing a composite color video signal from a recording medium, signal separating means connected to said transducer head means for separating an FM luminance signal and a chrominance signal from said reproduced composite color video signal, demodulating means provided in a signal path of said separated FM luminance signal for demodulating it, first gain control means provided in a signal path of said separated chrominance signal for controlling the signal level of the chrominance signal and receiving a reference signal included in said chrominance signal, level detecting means connected to the output of said demodulating means and detecting the level of said demodulated luminance signal, and a gain control signal generating means receiving the output of said level detecting means and supplying an input to said first gain control means so as to control the signal level of said chrominance signal in response to the detected level of said luminance signal, wherein said first gain control means includes capacitance means for applying a proper time constant to a signal level control loop based on said reference signal of the chrominance signal, wherein said capacitance means is connected to a reference potential through a resistance means, and the output of said gain control signal generating means supplied to the junction point between said capacitance means and said resistance means.

2. A signal reproducing circuit as cited in claim 1, wherein said transducer head for means includes two magnetic heads alternatively scanning said recording medium for removing signals therefrom.

3. A signal reproducing circuit as claimed in claim 2, wherein said capacitance means comprises two capacitors, and said two capacitors alternatively connected to first said gain control means.

4. A signal reproducing circuit as claimed in claim 3, wherein first ends of said two capacitors are commonly connected together and to a reference potential through said resistance means, and the signal from said level detecting means is supplied to said first ends of said capacitors.

5. A signal reproducing circuit for an under-chroma recording and/or reproducing system, comprising:
transducer head means for reproducing a composite color video signal from a recording medium,
signal separating means connected to said transducer head means for separating an FM luminance signal and a chrominance signal from said reproduced composite color video signal,
demodulating means provided in a signal path of said separated FM luminance signal for demodulating it,
first gain control means provided in a signal path of said separated chrominance signal for controlling the signal level of the chrominance signal and receiving a reference signal included in said chrominance signal,
level detecting means connected to the output of said demodulating means and detecting the level of said demodulated luminance signal,
a gain control signal generating means receiving the output of said level detecting means and supplying an input to said first gain control means so as to control the signal level of said chrominance signal in response to the detected level of said luminance signal,
said first gain control means includes capacitance means for applying a proper time constant to a signal level control loop based on said reference signal of the chrominance signal,
said capacitance means is connected to a reference potential through a resistance means, the output of said gain control signal generating means supplied to the junction point between said capacitance means and said resistance means,
said signal path for the separated chrominance signal includes frequency reconverting means for reconverting the reproduced chrominance signal to an original subcarrier frequency,
said transducer head means includes two magnetic heads for alternatively scanning said recording medium for removing signals therefrom,
said capacitance means comprises two capacitors and said two capacitors alternatively connected to first said gain control means,
first ends of said two capacitors are commonly connected together and to a reference potential through said resistance means, and the signal from said level detecting means is supplied to said first ends of said capacitors, and
switching means controlled in synchronism with said transducer head means for switching the outputs of said two capacitors to said gain control means.

6. A level compensating circuit of a reproducing chroma signal for an under-chroma recording and/or reproducing apparatus, comprising:
(A) transducer head means for reproducing a composite color video signal from a recording medium
(B) signal separating means connected to said transducer head means for separating an FM luminance signal and a chrominance signal from said reproduced composite color video signal,
(C) demodulating means provided in a signal path of said separated FM luminance signal for demodulating it,
(D) level detecting means for detecting the level of said demodulated luminance signal obtained from said demodulating means,
(E) switching means connected to said level detecting means for selecting said level in synchronism with said transducer head means,
(F) reference signal detecting means for detecting a level of said reference signal included in said chrominance signal,
(G) gain control means provided in a signal path of said separated chrominance signal, and connected to said switching means and reference signal detecting means for controlling the level of said chrominance signal.

7. A level compensating circuit of a reproducing chroma signal for an under-chroma recording and/or reproducing apparatus according to claim 6, wherein said switching means includes a switching device, two capacitors and a resistor.

8. A level compensating circuit of a reproducing chroma signal for an under-chroma recording and/or reproducing apparatus according to claim 6, wherein said reference signal detecting means includes a burst gate circuit for gating said reference signal.

9. A level compensating circuit of a reproducing chroma signal for an under-chroma recording and/or reproducing apparatus according to claim 8, wherein said reference signal is a reconverted reference signal to an original subcarrier frequency.

* * * * *